United States Patent
Ceschim et al.

(10) Patent No.: US 8,370,303 B1
(45) Date of Patent: Feb. 5, 2013

(54) GENERATING SNAPSHOTS OF DATA TABLES

(75) Inventors: Wanderley M. Ceschim, Snoqualmie, WA (US); David N. Biddle, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 96 days.

(21) Appl. No.: 12/826,809

(22) Filed: Jun. 30, 2010

(51) Int. Cl.
*G06F 17/30* (2006.01)

(52) U.S. Cl. ............................ 707/640; 707/625

(58) Field of Classification Search ............ 707/624, 707/625, 646, 647, 999.203–999.204
See application file for complete search history.

(56) References Cited

U.S. PATENT DOCUMENTS

| | | | | |
|---|---|---|---|---|
| 5,963,959 A * | 10/1999 | Sun et al. | | 1/1 |
| 6,697,804 B1 * | 2/2004 | Elsbernd et al. | | 1/1 |
| 6,725,240 B1 * | 4/2004 | Asad et al. | | 1/1 |
| 7,200,624 B2 * | 4/2007 | He et al. | | 1/1 |
| 7,287,249 B2 * | 10/2007 | Coyle et al. | | 717/168 |
| 7,840,601 B2 * | 11/2010 | Bicker et al. | | 707/795 |
| 8,037,013 B2 * | 10/2011 | Rao | | 1/1 |
| 2003/0009431 A1 * | 1/2003 | Souder et al. | | 707/1 |

* cited by examiner

*Primary Examiner* — Debbie Le
(74) *Attorney, Agent, or Firm* — Thomas|Horstemeyer, LLP.

(57) ABSTRACT

Disclosed are various embodiments for generating snapshot data tables. Records are extracted from a predetermined plurality of tables in a master data store. The only records extracted are those which have changed since a last snapshot of the tables was taken. The extraction produces a corresponding plurality of working tables. For each of the working tables, any rows missing in the respective working table are determined. Those missing rows are filled in from the predetermined plurality of master tables based on a plurality of identifiers in working tables other than the one with the missing rows.

20 Claims, 4 Drawing Sheets

GENERATING SNAPSHOTS OF DATA TABLES

BACKGROUND

Some computer systems which process electronic transactions do so in real time, such that the transaction database which stores the transactions is always up-to-date. The data from the transaction database is used to generate various reports, which are generated offline rather than in real time, using batch data that is periodically pulled from the transaction database. A database architecture that works well for real time transaction processing is often inefficient for offline processing. Specifically, a transaction database typically uses normalized tables while a batch job database typically uses denormalized tables. While denormalized tables can be generated from normalized tables, conventional methods for doing so are slow when the tables are extremely large.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to generating snapshots of data tables. In various embodiments, the present disclosure improves performance when generating snapshots of data tables from master tables located in a master data store. A snapshot builder obtains from the master tables only those records which have changed since the last snapshot of the master tables was taken, to produce a corresponding set of working tables. Because master tables may include changes to different records, each working table may have a different number of rows. For each working table, the snapshot builder fills in any missing rows in the working table from corresponding rows in the other working tables. The result produced by the snapshot builder is a set of snapshot tables, each one corresponding to one of the master tables, but containing only those records which have changed in any of the master tables. The snapshot tables may be used to generate other tables, for example, denormalized tables. In some embodiments, only a subset of the master tables may be included in the snapshot.

Figure 1:
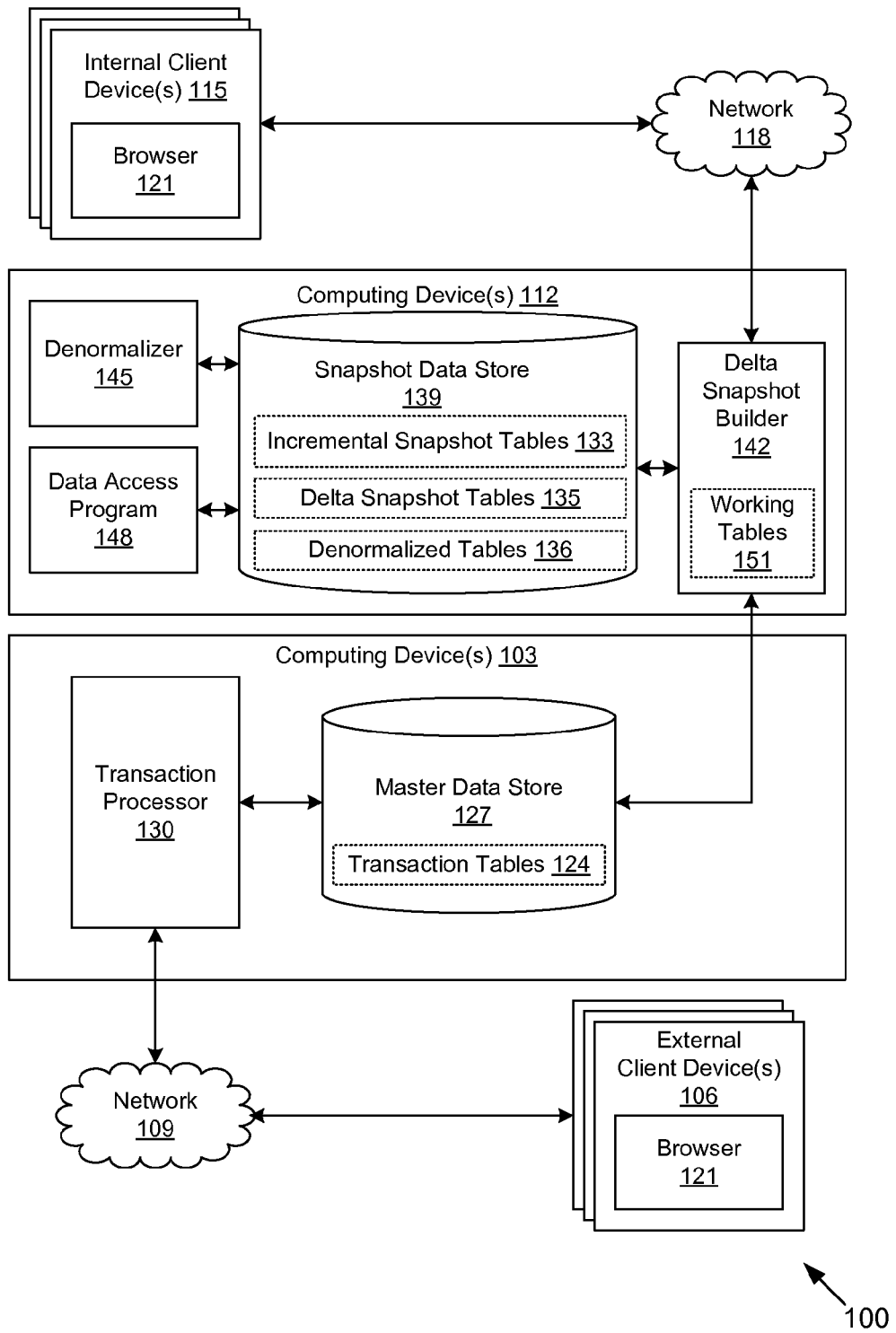
FIG. 1 is a drawing of a networked environment according to various embodiments of the present disclosure.

With reference to FIG. 1, shown is a networked environment 100 according to various embodiments. The networked environment 100 includes a computing device 103 that is in data communication with one or more external client devices 106 by way of a network 109. The networked environment 100 also includes a computing device 112 that is in data communication with one or more internal client devices 115 by way of a network 118. In various embodiments, the networks 118, 109 may be the same network or different networks. The networks 118, 109 include, for example, the Internet, intranets, extranets, wide area networks (WANs), local area networks (LANs), wired networks, wireless networks, or other suitable networks, etc., or any combination of two or more such networks.

The computing devices 112, 103 may comprise, for example, a server computer or any other system providing computing capability. Alternatively, the computing devices 112, 103 may be implemented as a plurality of computing devices that are arranged, for example, in one or more server banks or computer banks or other arrangements. To this end, a plurality of computing devices 112, 103 together may comprise, for example, a cloud computing resource, a grid computing resource, and/or any other distributed computing arrangement. Such computing devices 112, 103 may be located in a single installation or may be dispersed among many different geographical locations. For purposes of convenience, the computing devices 112, 103 are each referred to herein in the singular. Even though each of the computing devices 112, 103 is referred to in the singular, it is understood that a plurality of computing devices 112, 103 may be employed in the various arrangements as described above.

The external client device 106 is representative of a plurality of client devices that may be coupled to the network 109. The external client device 106 may comprise, for example, a processor-based system such as a computer system. Such a computer system may be embodied in the form of a desktop computer, a laptop computer, a personal digital assistant, a cellular telephone, a set-top box, a music player, a web pad, a tablet computer system, a game console, or other devices with like capability.

The external client device 106 may be configured to execute various applications such as a browser 121 and/or other applications. The browser 121 may be executed in an external client device 106, for example, to access and render network pages, such as web pages, or other network content served up by servers on the network 109. In particular, an end user, such as a customer, may interact with the browser 121 to conduct electronic commerce transactions which are processed by a transaction processor 130 executing on the computing device 103. The external client device 106 may be configured to execute applications beyond the browser 121 such as, for example, email applications, instant message applications, and/or other applications.

Turning now from the external client device 106 to the computing device 103, various applications and/or other functionality may be executed in the computing device 103 according to various embodiments. Also, various transaction tables 124 are stored in a master data store 127 that is accessible to the computing device 103. The transaction tables 124 stored in the master data store 127, for example, are associated with the operation of the various applications and/or functional entities described below. In some embodiments, the master data store 127 is implemented by a relational database.

The components executed on the computing device 103, for example, include a transaction processor 130 and other applications, services, processes, systems, engines, or functionality not discussed in detail herein. The transaction processor 130 is executed to process electronic transactions received from one of the external client devices 106. In some embodiments, these electronic transactions are transactions for electronic commerce, and in such embodiments the transaction tables 124 represent electronic commerce transactions.

Moving on from the computing device 103 to the computing device 112, various applications and/or other functionality may be executed in the computing device 112 according to various embodiments. Also, various incremental snapshot tables 133, delta snapshot tables 135, and denormalized tables 136 are stored in a snapshot data store 139 that is accessible to the computing device 112. The tables 133, 135, 136 stored in the snapshot data store 139 for example, are associated with the operation of the various applications and/or functional entities described below. In some embodiments, the snapshot data store 139 is implemented by a relational database.

The components executed on the computing device 112, for example, include a delta snapshot builder 142, a denormalizer 145, a data access program 148, and other applications, services, processes, systems, engines, or functionality not discussed in detail herein. The delta snapshot builder 142 communicates (directly or indirectly) with the transaction processor 130 to create periodic copies ("snapshots") of the transaction data from master data store 127, where these snapshots contain only those records that have changed ("deltas"). In some embodiments, the delta snapshot tables 135 are created by obtaining data directly from the transaction tables 124, and processing that data. In other embodiments, the delta snapshot tables 135 are instead created by obtaining data from incremental snapshot tables 133, where incremental snapshot tables 133 are themselves created from the transaction tables 124. The delta snapshot builder 142 may use various working tables 151 in creating the delta snapshot tables 135. After processing the working tables 151 and/or the incremental snapshot tables 133, the delta snapshot builder 142 stores the results in the form of various delta snapshot tables 135 in the snapshot data store 139. The denormalizer 145 uses one or more of the snapshot tables 133 to build one or more denormalized tables 136.

Moving now from the computing device 112 to the internal client device 115, the internal client device 115 is representative of a plurality of client devices that may be coupled to the network 118. The external client device 106 may comprise, for example, a processor-based system such as a computer system. Such a computer system may be embodied in the form of a desktop computer, a laptop computer, a personal digital assistant, a cellular telephone, a set-top box, a music player, a web pad, a tablet computer system, a game console, or other devices with like capability.

The internal client device 115 may be configured to execute various applications such as a browser 121 and/or other applications. The browser 121 may be executed in an internal client device 115, for example, to access and render network pages, such as web pages, or other network content served up by servers on the network 109. In particular, a user may use the browser 121 to communicate with the data access program 148, which provides views or reports of the various snapshot tables 133 in the snapshot data store 139. The external client device 106 may be configured to execute applications beyond the browser 121 such as, for example, email applications, instant message applications, and/or other applications.

Next, a general description of the operation of the various components of the networked environment 100 is provided. To begin, a customer may use an external client device 106 to communicate over the network 109 with the transaction processor 130, executing on the computing device 103, to conduct an electronic commerce transaction. To accomplish this, a web server (not shown) may, in one embodiment, generate one or more network pages comprising an electronic commerce user interface. The web server sends the generated network page(s) over the network 109 to the external client device 106. The generated network page(s) are then rendered by the browser 121.

In response to receiving an electronic commerce transaction, the transaction processor 130 processes the transaction, which involves making changes to the transaction tables 124 in the master data store 127. For example, in response to a customer placing an order, a record may be created and stored in a customer order table residing in the master data store 127. Other transactions may take place after an order, for example, in fulfilling a customer order the transaction processor 130 may create a shipment record and store it in a shipment table residing in master data store 127. The transaction processor 130 operates essentially in real time, such that the various tables in the master data store 127 are always up-to-date.

As noted above, the transaction processor 130 operates on data in its associated snapshot data store 139 essentially in real time. In contrast, the delta snapshot builder 142 communicates (directly or indirectly) with the transaction processor 130 to create periodic copies ("snapshots") of the transaction data. The delta snapshot builder 142 stores the snapshots, in the form of various snapshot tables 133, in the snapshot data store 139. The time between snapshots may be, for example, a number of minutes, hours, days, or some other time period. In some embodiments, snapshots for multiple time periods are stored, while in other embodiments, creation of a new snapshot also involves deleting the previous snapshot so that only the most recent snapshot is kept.

The snapshot tables 133 are used as input by the denormalizer 145 to create a set of denormalized tables 136 which correspond to the normalized transaction tables 124 used by the transaction processor 130. The denormalized tables 136 may then be used by other components, such as the data access program 148, to process the transaction data "offline" and to produce various views or reports. These views and reports may then be provided to a user of the internal client device 115 via the browser 121.

Figure 2:
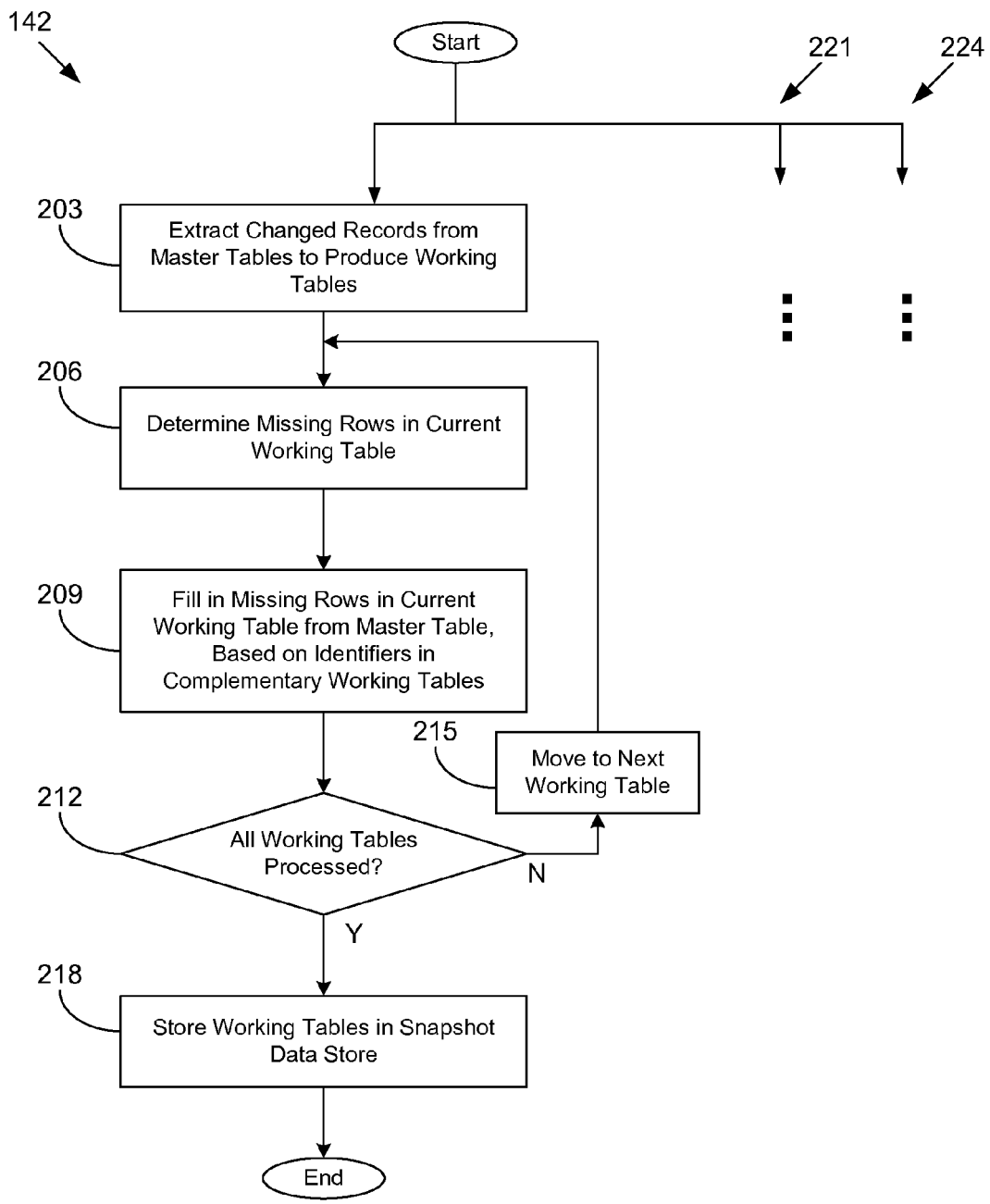
FIGS. 2 and 3 are flowcharts illustrating examples of functionality implemented as portions of a snapshot builder executed in a computing device in the networked environment of FIG. 1 according to various embodiments of the present disclosure.

Referring next to FIG. 2, shown is a flowchart that provides one example of the operation of a portion of the delta snapshot builder 142 according to some embodiments. It is understood that the flowchart of FIG. 2 provides merely an example of the many different types of functional arrangements that may be employed to implement the operation of the portion of the delta snapshot builder 142 as described herein. As an alternative, the flowchart of FIG. 2 may be viewed as depicting an example of steps of a method implemented in the computing device 112 (FIG. 1) according to one or more embodiments. The functions described in connection with FIG. 2 may be implemented in a database query language, such as Structured Query Language (SQL) or another appropriate query language, as should be appreciated.

Beginning with box 203 the delta snapshot builder 142 extracts, from a predetermined set of tables in master data store 127, only those records which have changed since a last snapshot was taken. In some embodiments, an audit field or flag conveys which, if any, field has changed. This predetermined set of tables in the master data store 127, referred to herein as master tables, may be related tables, in that they have a common identifier or key. The master tables used for extraction may also have other fields in common, yet one table may also include fields not present in another. Thus, there may be partial yet not complete overlap in the master tables.

The extraction in box 203 produces a set of intermediate or working tables, each corresponding to one of the predetermined set of tables in the master data store 127. Thus, an extraction using two tables from the master data store 127 as input would produce two working tables. However, the tables in the working set may have different numbers of rows. For example, consider the situation of a master order table with a change to the record in the third row (identifier "AA"), yet no change to the record in the master order items table for the same identifier "AA." In such a situation, the working order table has a row for identifier "AA," but the working order items table is missing a row for identifier "AA." The delta snapshot builder 142 corrects for these missing rows as follows.

Starting with box 206, the delta snapshot builder 142 iterates through all the tables in the working set of tables. In box 206 the delta snapshot builder 142 determines which rows, if any, of the current table are missing relative to the other tables in the working set. Next, in box 209, the delta snapshot builder 142 fills in any missing rows from the master table, based on identifiers in complementary working tables. For example, if the working order table is missing two rows (identifiers "AA" and "AZ") and there are two other working tables (order items and order item details), then box 209 fills in row "AA" of the order table with data from row "AA" of the master order items table and with data from row "AA" of the master order item details table. In this situation, box 209 also fills in row "AZ" of the order table with data from row "AZ" of the master order items table and with data from row "AZ" of the master order item details table. Where the extraction function performed by box 203 operates only on changed records, the fill function performed by box 209 ignores or operates irrespective of the changed status of the records in the working set of tables.

In some embodiments, the corresponding table used to fill in the missing row is a table from a previous snapshot stored in snapshot data store 139. Notably, although the previous snapshot contains stale transaction data, and excludes changes since the snapshot, the row in question is missing and thus is known to have no changes. In other embodiments, the corresponding table used to fill in the missing row is one from master data store 127.

Next, in box 212 the delta snapshot builder 142 determines whether all tables in the working set have been processed. If, in box 212 the delta snapshot builder 142 determines that not all tables have been processed, the delta snapshot builder 142 moves to box 215, where the delta snapshot builder 142 moves to the next table in the current working set, then repeats processing again starting with block 206. If, in box 212 the delta snapshot builder 142 determines that all tables in the working set have been processed, the delta snapshot builder 142 moves to box 218. In box 218, the delta snapshot builder 142 stores the tables generated by the iterative process described above as delta snapshot tables 135 in the snapshot data store 139. Thereafter, the delta snapshot builder 142 ends.

As indicated by branches 221 and 224, the boxes 203, 206, 209, 212, 215, and 218 may be performed concurrently (i.e., in parallel). That is, while boxes 203, 206, 209, 212, 215, and 218 are processing a first master table, the branch 221 may execute the same functionality for a second master table. Similarly, the branch 224 may concurrently execute the same functionality for a third master table. In this manner, the delta snapshot builder 142 may process N master tables in parallel. Alternatively, N master tables may be processed serially.

Figure 3:
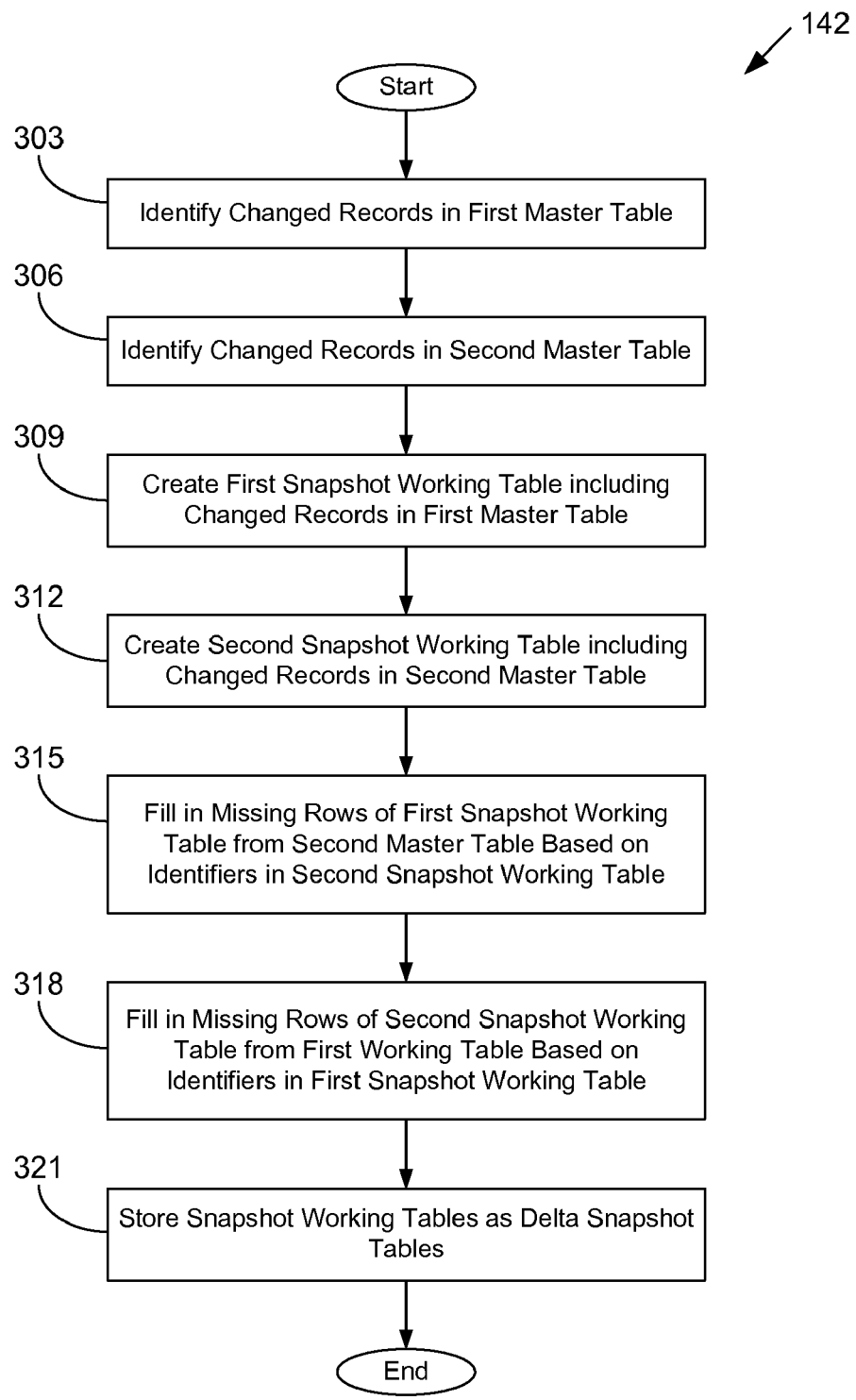

Turning now to FIG. 3, shown is a flowchart that provides one example of the operation of a portion of the delta snapshot builder 142 according to other embodiments. It is understood that the flowchart of FIG. 3 provides merely an example of the many different types of functional arrangements that may be employed to implement the operation of the portion of the delta snapshot builder 142 as described herein. As an alternative, the flowchart of FIG. 3 may be viewed as depicting an example of steps of a method implemented in the computing device 112 (FIG. 1) according to one or more embodiments. The functions described in connection with FIG. 3 may be implemented in a database query language, such as Structured Query Language (SQL) or another appropriate query language, as should be appreciated.

Beginning with box 303 the delta snapshot builder 142 identifies records in a first table in the master data store 127 which have changed since a last snapshot was taken. Next, in box 306 the delta snapshot builder 142 identifies records in a second table in the master data store 127 which have changed since a last snapshot was taken. In this manner, the delta snapshot builder 142 identifies two sets of changed records. In some embodiments, an audit field or flag conveys which, if any, field has changed in the first and second tables from the master data store 127.

The tables that are processed in boxes 303 and 306, referred to herein as master tables, may be any subset of tables in the master data store 127 or even all tables in the master data store 127. The master tables may be related, in that they have a common identifier or key. The master tables may also have other fields in common, yet one table may also include fields not present in another. Thus, there may be partial yet not complete overlap in the subset of master tables.

In box 309 the delta snapshot builder 142 creates a first snapshot working table containing the changed records from the first master table in the master data store 127. In box 312 the delta snapshot builder 142 creates a second snapshot working table containing the changed records from the master second table in master data store 127. These working tables form a new snapshot data set which includes a superset of the changed identifiers from the first and second master tables in the master data store 127. Because in some situations the tables in the snapshot data set may have different numbers of rows, the delta snapshot builder 142 corrects for these missing rows as follows.

Next in box 315 the delta snapshot builder 142 fills in missing rows of the first snapshot table. For all record identifiers present in the second snapshot working table, but not the first snapshot working table, the delta snapshot builder 142 fetches the row with the same identifier from the second master table and stores it in the first snapshot working table. In other words, if the two snapshot working tables are an order table and an order items table, and the snapshot order working table is missing row "AB," then the delta snapshot builder 142 fetches row "AB" from the master order items table. Note that although the master order table contains stale transaction data, and excludes changes since the snapshot, the row in question is missing and thus is known to have no changes.

In box 318 the delta snapshot builder 142 performs an analogous operation to fill in missing rows of the second snapshot working table. For all record identifiers present in the first snapshot working table, but not in the second snapshot working table, the delta snapshot builder 142 fetches the row with the same identifier from the first master table and stores it in the second snapshot working table.

Next in box 321, the delta snapshot builder 142 stores the snapshot working tables as delta snapshot tables 133 in the snapshot data store 139. Thereafter, the delta snapshot builder 142 ends.

Figure 4:
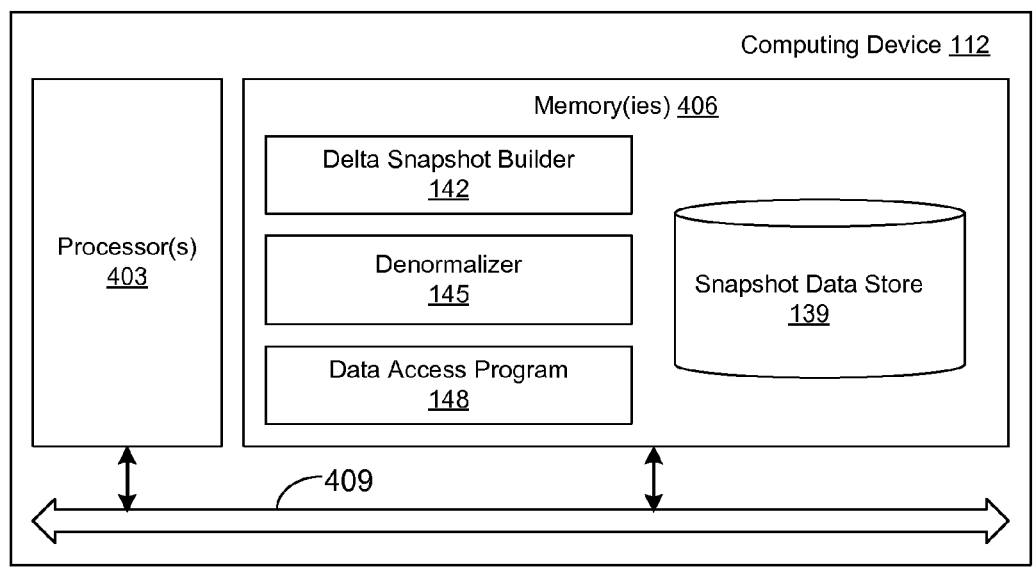
FIG. 4 is a schematic block diagram that provides one example illustration of a computing device employed in the networked environment of FIG. 1 according to various embodiments of the present disclosure.

With reference to FIG. 4, shown is a schematic block diagram of the computing device 112 according to an embodiment of the present disclosure. The computing device 112 includes at least one processor circuit, for example, having a processor 403 and a memory 406, both of which are coupled to a local interface 409. To this end, the computing device 112 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the delta snapshot builder 142, denormalizer 145, data access program 148, and potentially other applications. Also stored in the memory 406 may be a snapshot data store 139, a master data store 127, and other data. In addition, an operating system may be stored in the memory 406 and executable by the processor 403. While not illustrated, the computing device 103 also includes components like those shown in FIG. 4, whereby the transaction processor 130 is stored in a memory and executable by a processor.

It is understood that there may be other applications that are stored in the memory 406 and are executable by the processor 403 as can be appreciated. Where any component discussed herein is implemented in the form of software, any one of a number of programming languages may be employed such as, for example, C, C++, C#, Objective C, Java, Java Script, Perl, PHP, Visual Basic, Python, Ruby, Delphi, Flash, or other programming languages.

A number of software components are stored in the memory 406 and are executable by the processor 403. In this respect, the term "executable" means a program file that is in a form that can ultimately be run by the processor 403. Examples of executable programs may be, for example, a compiled program that can be translated into machine code in a format that can be loaded into a random access portion of the memory 406 and run by the processor 403, source code that may be expressed in proper format such as object code that is capable of being loaded into a random access portion of the memory 406 and executed by the processor 403, or source code that may be interpreted by another executable program to generate instructions in a random access portion of the memory 406 to be executed by the processor 403, etc. An executable program may be stored in any portion or component of the memory 406 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 406 is defined herein as including both volatile and nonvolatile memory and data storage components. Volatile components are those that do not retain data values upon loss of power. Nonvolatile components are those that retain data upon a loss of power. Thus, the memory 406 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 403 may represent multiple processors 403 and the memory 406 may represent multiple memories 406 that operate in parallel processing circuits, respectively. In such a case, the local interface 409 may be an appropriate network 109, 118 (FIG. 1) that facilitates communication between any two of the multiple processors 403, between any processor 403 and any of the memories 406, or between any two of the memories 406, etc. The local interface 409 may comprise additional systems designed to coordinate this communication, including, for example, performing load balancing. The processor 403 may be of electrical or of some other available construction.

Although the delta snapshot builder 142, the denormalizer 145, the data access program 148, and other various systems described herein may be embodied in software or code executed by general purpose hardware as discussed above, as an alternative, the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3 and 4 show the functionality and operation of an implementation of portions of the delta snapshot builder 142. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 403 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the delta snapshot builder 142, the denormalizer 145, and the data access program 148, that comprises software or code can be embodied in any non-transitory computer-readable medium for use by or in connection with an instruction execution system such as, for example, a processor 403 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:
    code that identifies a portion of changed records in a first electronic commerce transaction table of a master transaction data store;
    code that identifies a portion of changed records in a second electronic commerce transaction table of the master transaction data store;
    code that creates a first snapshot working table which contains the portion of changed records from the first electronic commerce transaction table;
    code that creates a second snapshot working table which contains the portion of changed records from the second electronic commerce transaction table;
    code that determines a first plurality of identifiers present in the second snapshot working table but not present in the first snapshot working table and fetches from the second master table a row corresponding to each of the first plurality of identifiers, and stores in the first snapshot table the row from the second master table corresponding to the first plurality of identifiers; and
    code that determines a second plurality of identifiers present in the first snapshot working table but not present in the second snapshot working table and fetches from the first master table a row corresponding to each of the second plurality of identifiers, and stores in the second snapshot working table the row from the first master table corresponding to the second plurality of identifiers.

2. The computer-readable medium of claim 1, further comprising code that concurrently obtains the portion of changed records from the first electronic commerce transaction tables and the portion of changed records from the second electronic commerce transaction tables.

3. The computer-readable medium of claim 1, further comprising code that stores the first snapshot working table and the second snapshot working table in a snapshot data store.

4. The computer-readable medium of claim 1, further comprising code that performs a transform on the first snapshot working table in order to create a denormalized table.

5. A system, comprising:
    at least one computing device; and
    a snapshot builder executable in the at least one computing device, the snapshot builder comprising:
        logic that obtains a plurality of changed records from a plurality of master tables in a master data store to produce a corresponding plurality of working tables, the changed records corresponding to only those records changed since a last snapshot of the master tables was taken; and
        logic that fills a plurality of missing rows in each working table from corresponding rows of one of the master tables, based on a plurality of identifiers in a complementary one of the working tables, to produce a plurality of delta snapshot tables.

6. The system of claim 5, wherein the logic that fills operates irrespective of whether records in the working table have changed.

7. The system of claim 5, wherein the logic that fills determines the missing rows relative to the other working tables.

8. The system of claim 5, wherein the logic that obtains determines which records have changed using an audit flag.

9. The system of claim 5, wherein the snapshot builder concurrently obtains the changed records from different ones of the plurality of master tables.

10. The system of claim 5, the snapshot builder further comprising logic that stores the plurality of snapshot tables in a snapshot data store.

11. The system of claim 5, wherein the snapshot builder concurrently fills the plurality of missing rows from different ones of the working tables.

12. The system of claim 5, wherein the tables in the master data store contain electronic commerce transactions.

13. A method, comprising the steps of:
    extracting, in at least one computing device, from a predetermined plurality of master tables in a master data store, a plurality of records to produce a corresponding plurality of working tables, the records corresponding to only those which have changed since a last snapshot of the master tables was taken; and
    for each of the plurality of working tables, determining, in the at least one computing device, a plurality of missing rows in the each working table and filling in the missing rows from the predetermined plurality of master tables based on a plurality of identifiers in working tables other than the one with the missing rows.

14. The method of claim 13, wherein the filling in the missing rows operates irrespective of whether records in the working table have changed.

15. The method of claim 13, wherein the determining the missing rows makes the determination relative to the other working tables.

16. The method of claim 13, wherein the extracting determines which records in the master tables have changed using an audit flag.

17. The method of claim 13, wherein the extracting step extracts concurrently from different ones of the plurality of master tables.

18. The method of claim 13, further comprising the step of storing, in the at least one computing device, the plurality of working tables in a snapshot data store.

19. The method of claim 13, wherein the filling in the missing rows fills in concurrently from different ones of the plurality of master tables.

20. The method of claim 13, wherein the master tables in the master data store contain electronic commerce transactions.

* * * * *